(12) United States Patent
Gao et al.

(10) Patent No.: US 6,490,579 B1
(45) Date of Patent: Dec. 3, 2002

(54) SEARCH ENGINE SYSTEM AND METHOD UTILIZING CONTEXT OF HETEROGENEOUS INFORMATION RESOURCES

(75) Inventors: Yong Gao, Canton, MA (US); Dundee Navin-Chandra, Farmingham, MA (US)

(73) Assignee: Perot Systems Corporation, Plano, TX (US)

( * ) Notice: Subject to any disclaimer, the term of this patent is extended or adjusted under 35 U.S.C. 154(b) by 0 days.

(21) Appl. No.: 09/116,525

(22) Filed: Jul. 16, 1998

(51) Int. Cl.[7] .............................................. G06F 17/30
(52) U.S. Cl. ................. 707/4; 707/5; 707/10; 707/3
(58) Field of Search ............... 707/526, 1–10, 707/100–103, 200–201, 500–501.1, 513–517, 522–524, 529–531; 345/326, 338, 357, 520, 845, 700

(56) References Cited

U.S. PATENT DOCUMENTS

| | | | |
|---|---|---|---|
| 4,805,134 A | | 2/1989 | Calo ........................... 707/10 |
| 5,659,732 A | | 8/1997 | Kirsch ............................ 707/5 |
| 5,692,176 A | | 11/1997 | Holt et al. ...................... 707/5 |
| 5,710,918 A | | 1/1998 | Lagarde et al. ................ 707/10 |
| 5,933,823 A | * | 8/1999 | Cullen et al. ................... 707/6 |
| 5,963,940 A | * | 10/1999 | Liddy et al. .................... 707/5 |
| 6,018,733 A | * | 1/2000 | Kirsch et al. .................. 707/3 |
| 6,029,165 A | * | 2/2000 | Gable ............................ 707/3 |
| 6,094,649 A | * | 7/2000 | Bowen et al. .................. 707/3 |
| 6,102,969 A | * | 8/2000 | Christianson et al. .......... 717/8 |
| 6,112,203 A | * | 8/2000 | Bharat et al. ................... 707/5 |
| 6,189,002 B1 | * | 2/2001 | Roitblat ......................... 707/1 |

* cited by examiner

*Primary Examiner*—Alford W. Kindred
(74) *Attorney, Agent, or Firm*—Jenkens & Gilchrist PC

(57) ABSTRACT

A system and method for facilitating the retrieval of information from a system of distributed computers or information resources is disclosed. In particular, the system and method of the present invention improves upon metasearch techniques by including information resource profiles that provide directives to the metasearch engine for facilitating information recovery. These information resource profiles additionally allow for metasearches to recover information from non-indexed information resources such as when browsing the web. Contextual searching is further provided via a grouping of the information resource profiles. The present invention is further directed to tools for the creation and management of the information resource profiles.

34 Claims, 6 Drawing Sheets

SEARCH ENGINE SYSTEM AND METHOD UTILIZING CONTEXT OF HETEROGENEOUS INFORMATION RESOURCES

RELATED APPLICATION

The instant application is related to another patent application of the Applicants and Applicants' Assignee, entitled "System and Method for Integrating Search Results for Heterogeneous Information Resources", filed concurrently herewith, U.S. patent application Ser. No. 09/116,783, and incorporated herein by reference.

BACKGROUND OF THE INVENTION

1. Technical Field of the Invention

The present invention relates to computers and computer systems employing search engines for use on the World Wide Web and other sources of distributed information, and, in particular, to a method and system for an improved metasearch engine utilizing contextual data on information sources' contexts.

2. Glossary of Terms

User: An agent, human or machine, which is the source of the information request.

Information Resource: Locations where information is stored electronically. This may include text and multimedia information. The information resources can provide search interfaces to the data they contain and/or provide menu-driven interfaces that allow the using agent to browse the information resources.

Hit: An atomic piece of information. A hit is typically used to refer to a specific document that is returned by a search engine. Hits are selected by the search engine from its typically vast set of documents.

Document: Any piece of electronic information. It can be a multimedia document containing text, graphics, video and sound. It can also be a program or other form of binary data.

Query: An encapsulation of what the user wants. A query can consist of the following: keywords, phrases, boolean logic, numbers, SQL statements, paragraphs or segments thereof, pictures, sketches, the context of the search, the types of documents required, and a list of information sources to contact.

3. Description of Related Art

Since the introduction of the personal computer in the early 1980's, the PC has been subject to constant change, ever increasing in capability and usage. From its earliest form in which the data accessible was limited to that which the user could load from a floppy disk to the typical multi-gigabyte hard drives common on PCs today, the amount of data and the ease of obtaining this data have been growing rapidly. With the fruition of the computer network, the available data is no longer limited to the user's system or what the user can load on their system. Local Area Networks (LANs) are now common in small businesses, and in such networks users may, in addition to their own local data, obtain data from other local stations as well as data available on the local server. Corporate networks and inter-networks may connect multiple LANs, thereby increasing the data available to users. Larger still are Wide Area Networks (WANs) and Metropolitan Area Networks (MANs), the latter of which is designed to cover large cities.

The largest such network, commonly known as the World Wide Web or Internet, has introduced vast amounts of diversified information into the business place and home. The individual networks that make up the Internet include networks which may be served from sources such as commercial servers (.com), university servers (.edu), research and other networks of computers (.org, .net), and military networks (.mil). These networks are located throughout the world and their numbers are ever increasing with an estimated 85,000 new domain registrations presently occurring each month with countless Internet sites spawned from those domains. Recent (1998) estimates on the size of the Internet suggest a staggering 320 million web pages and a U.S. user population over 57 million.

Such dramatic growth, however, is accompanied by a number of difficulties, one of which, as witnessed by most users of the Internet attempting to recover specific information from the vast amounts of data therein, is the logistical problem of effectively searching and recovering specific information on a given topic. Much progress has nonetheless been made in Internet navigation and management since the earliest days in which a user essentially had to know the exact location of specific data. The user's labor was then in entering cryptic command line strings to recover the known, targeted data.

The development and implementation of Hypertext Markup Language (HTML) greatly increased the usability of the Internet by enabling a user to navigate through graphically intensive pages, as opposed to the purely text-based interfaces of the previous decades' devices. This navigation is now facilitated by use of a web browser, e.g., Netscape Navigator, Microsoft Internet Explorer, etc. Hypeitext, a method of cross-referencing, is now common on most web sites. A hypertext link appears as a word or phrase distinguishable from the surrounding text by a color or format distinction, or both. A user is able to click on a hypertext link and be transferred to another information service, which is often remote from the site with the originating hypertext link. Through the use of many such hypertext links, sites with similar content can be easily cross-referenced by the web developer allowing a user quick access to supplementary information that is distributed across the Internet.

Further facilitation of information access on the Internet has been made by numerous companies providing information search services, e g., Infoseek, Yahoo, etc., that provide "engines" to search the Internet, generally at no charge to the user. These companies commonly index the contents of large numbers of web pages, either the page's full text or summaries, and allow a user to search through the indices through the search engines provided on the respective companies' web pages.

Search engines may be defined as programs allowing a user to remotely perform keyword searches on the Internet. The searches may cover the titles of documents, Uniform Resource Locators (URLs), summaries, or full text. Usually, information service providers build indices, or databases, of web page contents through automated algorithms. As described, these indices may be of the full text or only a brief synopsis of a web page's text. By utilizing these automated algorithms, the compilation of indices of large numbers of pages is possible. These algorithms are commonly referred to as Spyders. By using these index building algorithms, Infoseek was able to index the full text of over 400,000 web pages in August of 1995. Generally, the results or "hits" of the search are presented to the user with hypertext links allowing the user to pick and choose the desired results and then transfer to a particular site associated with the selected search results in order to retrieve the desired information on the web pages therein.

Additionally, search engines commonly perform computations on the results of the user's query in order to generate a relative 'ranking' against the other hits. The rankings assigned to each hit are intended to provide a measure of relevance of the content of a particular information source, identified as containing potentially relevant information, to the query presented. Relevance algorithms are used in most search engines and are based on simple word occurrence measures. For example, if the word 'plastic' occurs within the text of a page, then that page will have an expected relevance to a query containing the word plastic. The relevance is then assigned a magnitude in the form of a rank. Often the rank is quantified on a number of factors including the number of times the word occurs in a page, whether the word is in the title of the page, whether the word is in a heading, proximity of multiple search terms appearing in the page's text, etc. More sophisticated relevance algorithms may utilize thesaurus indices to automatically expand on a given query using equivalent phraseology.

A further and more recent improvement is the creation and usage of a so-called metasearch engine, e.g., MetaCrawler. A metasearch engine parses and reformats a user query. The reformatted queries are then forwarded to numerous search engines with each discrete search engine receiving an appropriately formatted query pursuant to the protocols for that search engine. After retrieving the results from the individual search engines, the metasearch engine presents them to the user. The obvious advantage of these metasearch engines is the simplification of searching due to the elimination of the need for a user to formulate and submit an individual query for each of a number of discrete search engines, a non-trivial task since the formats and protocols of each individual search engine differ markedly. By using a metasearch engine, the user only has to submit a single query, saving effort and time.

It should be understood that search engines are primarily directed to searchable information resources, i.e., those resources that are either indexed by external search engines or have their own interface for accessing the information stored at that web site. Numerous information resources, however, may not contain a convenient interface or indices to facilitate a search of the contents. Current metasearch engines, e.g., MetaCrawler, provide an interface to several general-purpose search services, e.g., Yahoo, AltaVista, etc., thereby covering a larger portion of the web through use of numerous search engine indices. Another such engine, jango, provides a metasearch interface to various commercial search services within a particular domain or area, e.g., music shopping. Conventional metasearch engines, however, only reference pre-indexed resources and are inadequate to search the aforedescribed non-indexed information resources.

Another difficulty with conventional search engines is that much of the information on even a popular website is not always indexed. For example, dynamic information such as daily news or hot topics, being transitory in nature, may not be available, i.e., indexed on a frequent and regular basis or not at all. Further, the information may be out of date or too general and, therefore, irrelevant even though properly indexed. Additionally, a given search engine, even a metasearch engine, covers only a particular portion of the web, i.e., pertinent information resources or sites may be unavailable on one search engine but not another or not available at all for existing search engines.

Accordingly, users of conventional search and metasearch engines must sift through unwanted and irrelevant search results, spending a great deal of time in this winnowing process. Further, despite their name, conventional metasearch engines are not comprehensive and further searches are required to obtain a reliable search result.

It is, accordingly, an object of the present invention to provide an improved system and method by which a user submits a query to a metasearch engine whereupon the metasearch engine searches a plurality of disparate web-based information resources.

It is also an object of the present invention to provide a system and method for searching a variety of information resources whether indexed or not.

It is a further object of the present invention to provide a system and method whereby domain experts create and manage a number of disparate and distributed information resources to optimize search comprehensiveness.

SUMMARY OF THE INVENTION

The present invention is directed to a system and method for facilitating the retrieval of information from a system of distributed computers or information resources. In particular, the system and method of the present invention improves upon metasearch techniques by including information resource profiles that provide directives to the metasearch engine for facilitating information recovery. These information resource profiles additionally allow for metasearches to recover information from non-indexed information resources such as when browsing the web. Contextual searching is further provided via a grouping of the information resource profiles. The present invention is further directed to tools for the creation and management of the information resource profiles.

BRIEF DESCRIPTION OF THE DRAWINGS

A more complete understanding of the system and method of the present invention may be obtained by reference to the following Detailed Description when taken in conjunction with the accompanying drawings wherein.

DETAILED DESCRIPTION OF THE PRESENTLY PREFERRED EXEMPLARY EMBODIMENTS

Although the preferred embodiments of the present invention may be embodied in many different forms, the invention should not be construed as limited to the embodiments set forth herein; rather, these embodiments are provided so that this disclosure will be thorough and complete, and will fully convey the scope of the invention to those skilled in the art.

Figure 1:
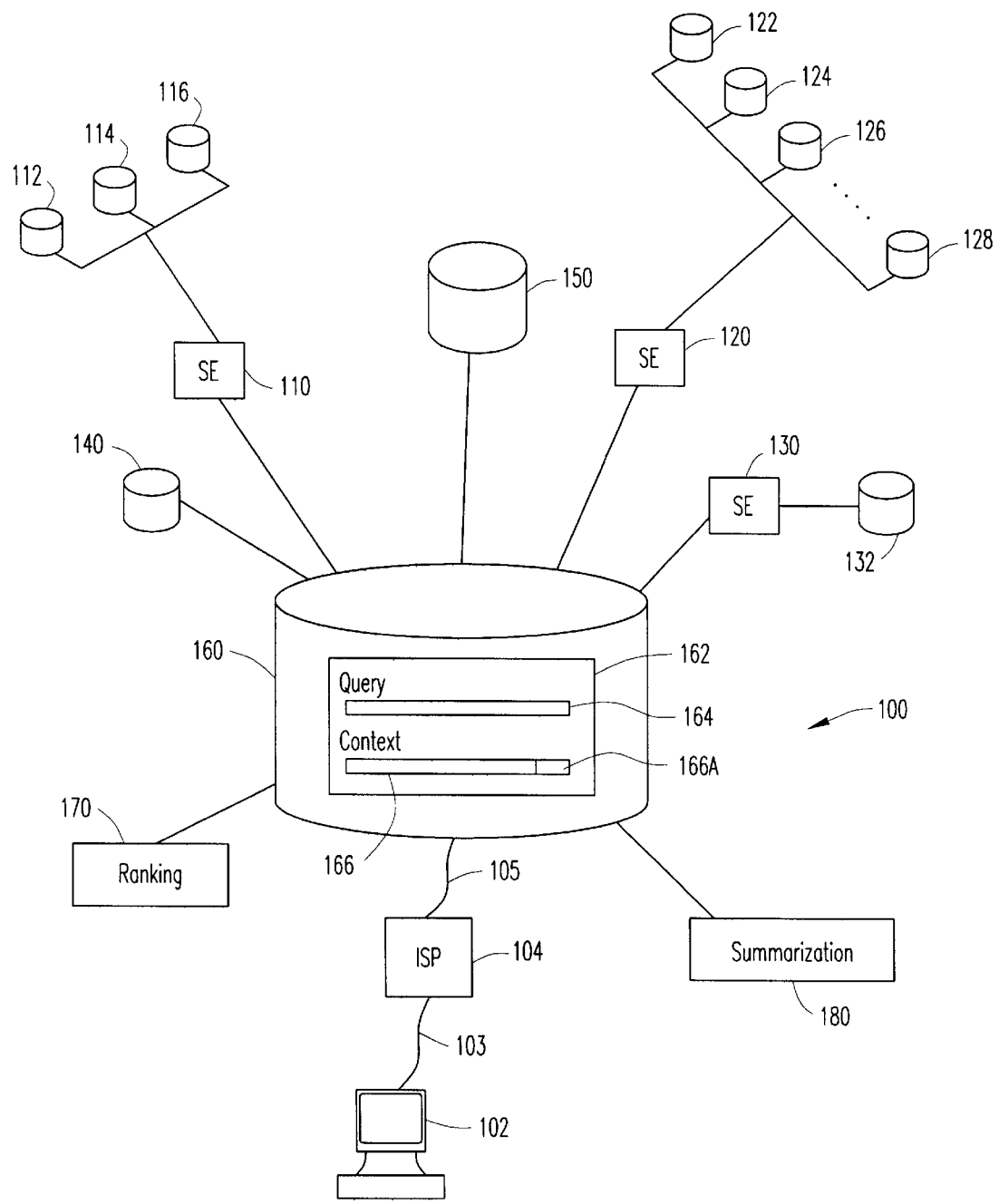
FIG. 1 illustrates a computer network configuration utilizing the principles of the present invention according to a first embodiment.

With reference now to FIG. 1, there is illustrated a network of computers as may be configured within a computer system 100, such as the Internet, and a user terminal 102 communicating with the Internet 100 via an Internet Service Provider or ISP 104 across a link 103 therebetween. Also illustrated in FIG. 1 are a number of independently-operating search engines on respective servers 110, 120 and 130, and a number of information resources on respective computers or servers 112, 114 and 116, each attached to server 110, servers 122, 124, 126 and 128, each attached to server 120, server 132 attached to server 130, and servers 140 and 150. For purposes of illustrating the multifaceted information sources available across the system 100, various servers, including those housing the aforementioned search engines, contain diverse information on particular technologies, e.g., the plastics industry.

With reference again to FIG. 1, servers 112 and 128, for example, could contain information pertaining to plastics recycling standards, and servers 124 and 150 contain information pertaining to plastics industry news. Similarly, server 116 may contain information concerning aluminum recycling standards, an analogous but most probably irrelevant art, and server 126 contains information on standard transmissions for automobiles and the recycled materials used in their manufacture, a non-analogous and irrelevant area relative to the desired topic. Similarly, server 122 contains information on automobile manufacturing and server 114 contains an on-line technical dictionary.

A metasearch engine 162, such as is the subject of the present invention, is contained within and operated from a server 160, through which the ISP 104 operates across a link 105. In the present and some of the forthcoming examples, a user communicating with the Internet 100 through terminal 102 is interested in recovering from the Internet 100, and the information sources therein, only information pertaining to plastic recycling standards.

A webmaster or domain expert is preferably responsible for defining relationships or domain contexts associated with each of the aforementioned information sources. It is understood that these information sources may include various web sites and proprietary databases, or any other information compilation accessible by the system 100. By having a context associated with a specific information source, queries submitted in accordance with the present invention, along with a given associated context, will not recover information from an information source having a context that is not consistent with the context associated with the query, thereby alleviating recovery of irrelevant information. For example, the metasearch engine 162 with the plastic recycling standards query would identify the context of the information sources on server 122, devoted to automobile manufacturing, as irrelevant because of the contextual mismatch. Consequently, particular information sources or the entire server 122 could be ignored, thereby avoiding the retrieval of irrelevant data. The preferred mechanism for this contextual sifting is set forth in more detail hereinbelow.

In an effort to facilitate the submission of a context-based query, the system and method of the present invention preferably operates with a collection of Information Resource Profiles (IRPs) that specify where, what and how the information is gathered and extracted from a particular information resource (IR). For example, if an IR contains a search interface, e.g., the respective search engines on servers 110, 120 and 130, then the respective IRPs for those search engines determine the mechanism for the request and retrieval of information therefrom. In this manner, the metasearch engine 162, transforms a query, such as the aforementioned plastics-recycling-standards query, into the format for Yahoo or any other such search interface.

Although some conventional metasearch engines in the art, e.g., MetaCrawler, are able to so transform queries to the formats of a Yahoo or other standardized format, such engines are unable to extract information from IRs that do not have a searchable interface. The present invention is able to overcome the deficiencies of the art by employing data mining and crawling techniques on these sites and subportions of sites (new information) to make them searchable and usable, as information resources, as described in more detail hereinafter.

With reference again to FIG. 1, the aforementioned query containing the terms "plastic", "recycle", and "standards" are entered in a query field 164. A search context may likewise be entered in an associated context field 166. Defined contexts for this query may include "Plastic Industry News" and "Plastic Recycling Standards" from which the user is allowed to choose, and which may be accessed and selected (by highlighting) from a list shown by clicking on a context example field 166A button. Since the user is only interested in information regarding plastic recycling standards, they should, therefore, choose the latter-defined context. The query is then parsed within the server 160 and reformatted, for. example, for submission to the respective three search engines on servers 110, 120 and 130 and any interfaces on servers 140 and 150.

Figure 2:
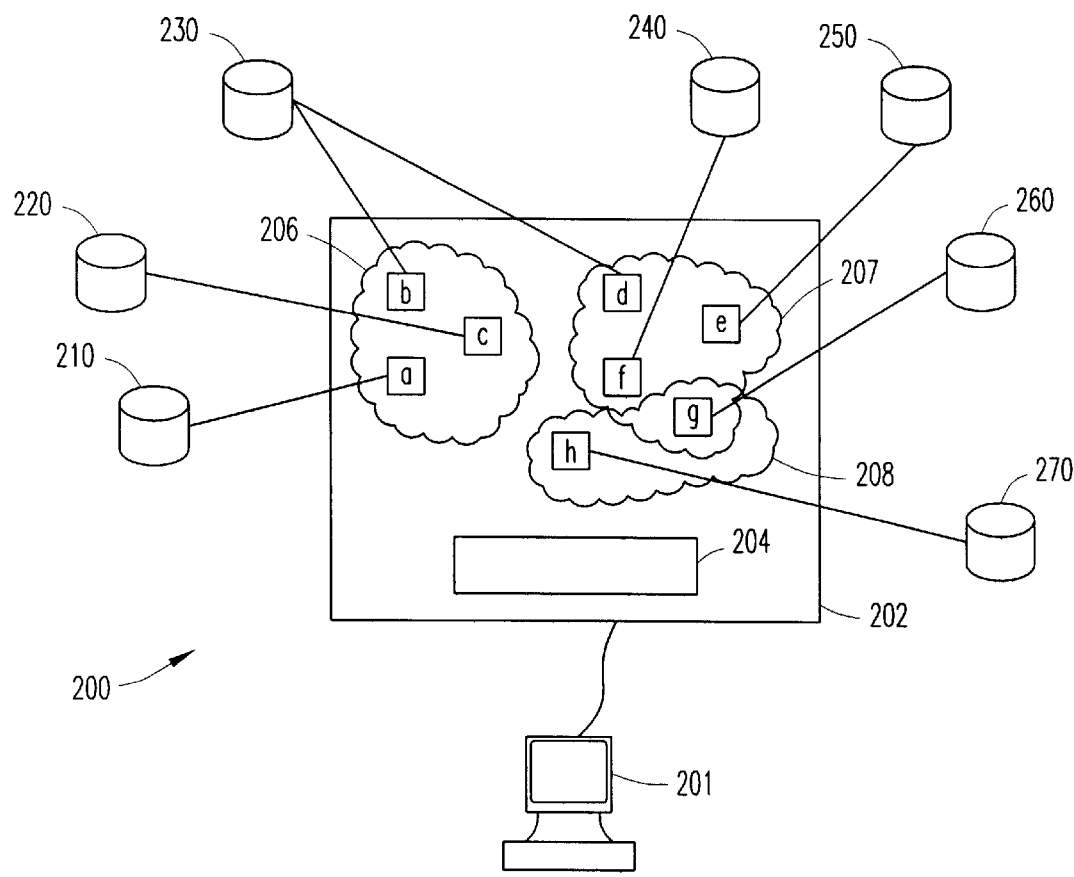
FIG. 2 illustrates the contextual searching capability of a system as shown in FIG. 1.

With reference now to FIG. 2 of the Drawings, there is shown a system 200 and a metasearch engine 202 of the present invention which contains a number of IRPs therein labeled a to h. Each IRP provides the system 200 (through the metasearch engine 202) with a description of how to contact and extract information (through search or browsing) from a remote server, and each contacts a respective external IR 210–270. It should be understood, however, that any IR may have a number of the IRPs corresponding thereto.

It should be understood that the IRs, shown in FIGS. 1 and 2, can be any electronic information resource, e.g., a website, a remote database, a search engine or another computer with internal files therein. Various IRPs may be organized into groups referred to herein as contexts. With reference again to FIG. 2, IRPs a, b and c are in a first group represented by the reference numeral 206, IRPs d, e and f are in a group 207, and IRPs g and h are in another group 208. By way of example, group 208 may constitute websites containing financial news information and group 207 covers business news information. As shown in FIG. 2, a given IRP, e.g., IRP g, may exist in different defined contexts.

After a user enters the query and the context into the respective fields 164 and 166 (in FIG. 1), the metasearch engine 162 (202 in FIG. 2) associates the request with the appropriate context to perform the requisite search. In particular, the respective IRPs are activated in parallel and pursuant to their profile each performs (if appropriate) the indicated action (search) at the respective IRs, which return the search results. The results from each IR are then combined using a conventional fusion technique or the improved ordering/ranking technique set forth in Applicants' co-pending application, and the results shown to the user on a terminal 201.

As discussed, the aforementioned information resource profiles or IRPs provide a description of what information resources or IRs to contact and how to extract relevant information therefrom in a uniform fashion so that multiple IRP results can be combined and displayed to the user (human or machine). In, a preferred embodiment of the present invention an IRP has the following parts:

CONTEXT
  1. Subject Areas
  2. Information Type
  3. Problem Type
LOCATION
  1. Pointer
  2. Access Method
  3. Security
ACTION
  1. Steps to access information
  2. Navigation
PATTERN
  1. Pattern to extract information
  2. Parameters to return As set forth above, each IRP has a particular context, i.e., at least one of a subject area, an information type or a problem type, which when specified are activated to get information. The first context, subject areas, represents a general or specific topic, e.g., "Manufacturing Magazines" or "Financial News". An information type represents the nature of the information referred to by that IRP, e.g., "News", "Resumes", "Web Homepager", etc. The last context, problem type, relates to the problem area that IRP addresses, e.g., if the IRP points to an IR about weed control, it may be listed under the Problem Type "Weeds in your garden?". The purpose of context is to associate the user's perception of context to the actual information resources that are relevant to that context.

The above IRP listing also includes a location, the first type being a pointer, e.g., a Uniform Resource Locator (URL), an Internet Protocol (IP) address, an Integrated Services Digital Network (ISDN) phone number, an analog/digital phone number, a machine (server) name, a network address or any other mode of computer addressing. The second location type, access method, indicates the manner of access, e.g., over the Internet using WEB/HTTP, GET/POST, TECNET, GOPHER, ARCHIE, VERONICA, FTP, sockets, Z39.50 and proprietary login methods. The final Location Type is security, where if a traditional login is required, the user name and password in this: field is used to enter the particular information resource. If HTTP authentication is required, the user name and password are then transmitted pursuant to the HTTP protocol. If SSL authentication is needed, the SSL encryption is used to login and establish the trusted connection. This same approach applies in FTP, ARCHIE, GOPHER and other methods requiring authentication.

Upon grant of access by the IR, the relevant action specified in the IRP is taken. Since there are a number of different information resources available, e.g., search engines, websites, etc., various actions may be taken. The most common action is issuing a query, i.e., the IRP sends the original query to the IR, which is a search engine or web/Internet interface, requiring that the query be reformatted by the IRP prior to submission to the IR. The results are then interpreted according to the pattern set forth therein and described further below.

If, however, the particular IR does not provide a search interface for the IRP, navigation or browsing is required. The IRP includes instructions on how to navigate or browse the information and links at the given IR to find the desired page/data, which is then downloaded by the IRP. If deeper browsing, i.e., crawling or data mining, is required, the IRP includes instructions on how to crawl the IR, i.e., locate and extract information from the IR, looking for information relevant to the user's query on pages and sub-pages of the IR. It should be understood that the uncovered information at that IR is indexed so that only relevant (to the original query) information is returned by the metasearch engine, which is typically performed in batch mode.

After obtaining the search query results, if any, at a given IR, the results are downloaded and interpreted by the IRP; which uses a pattern to extract information. First, the downloaded information is parsed. If in HyperText Markup Language (HTML), the tags therein are used to separate the data. The parsed information is then compared to the pattern.

Finally, certain parameters are extracted from the data, e.g., date, title, URL, summary, relevance score, classification/subject and address. Only those parameters available are extracted. This process is applied to the entire downloaded information, and each time a pattern is matched a separate record is created in memory. Each record may, therefore, be considered a search engine "hit". The collection of records with the above attributes are returned by the IRP to a central processor where information from all other IRPs in the same context is also collected. Since the information returned by each IRP follows the same format, e.g., date, title and URL, it is possible to display information from different IRs in a uniform manner. A ranking 170 and summarization 180 are also performed to facilitate display, as set forth in more detail in Applicants' co-pending patent application.

Figure 3:
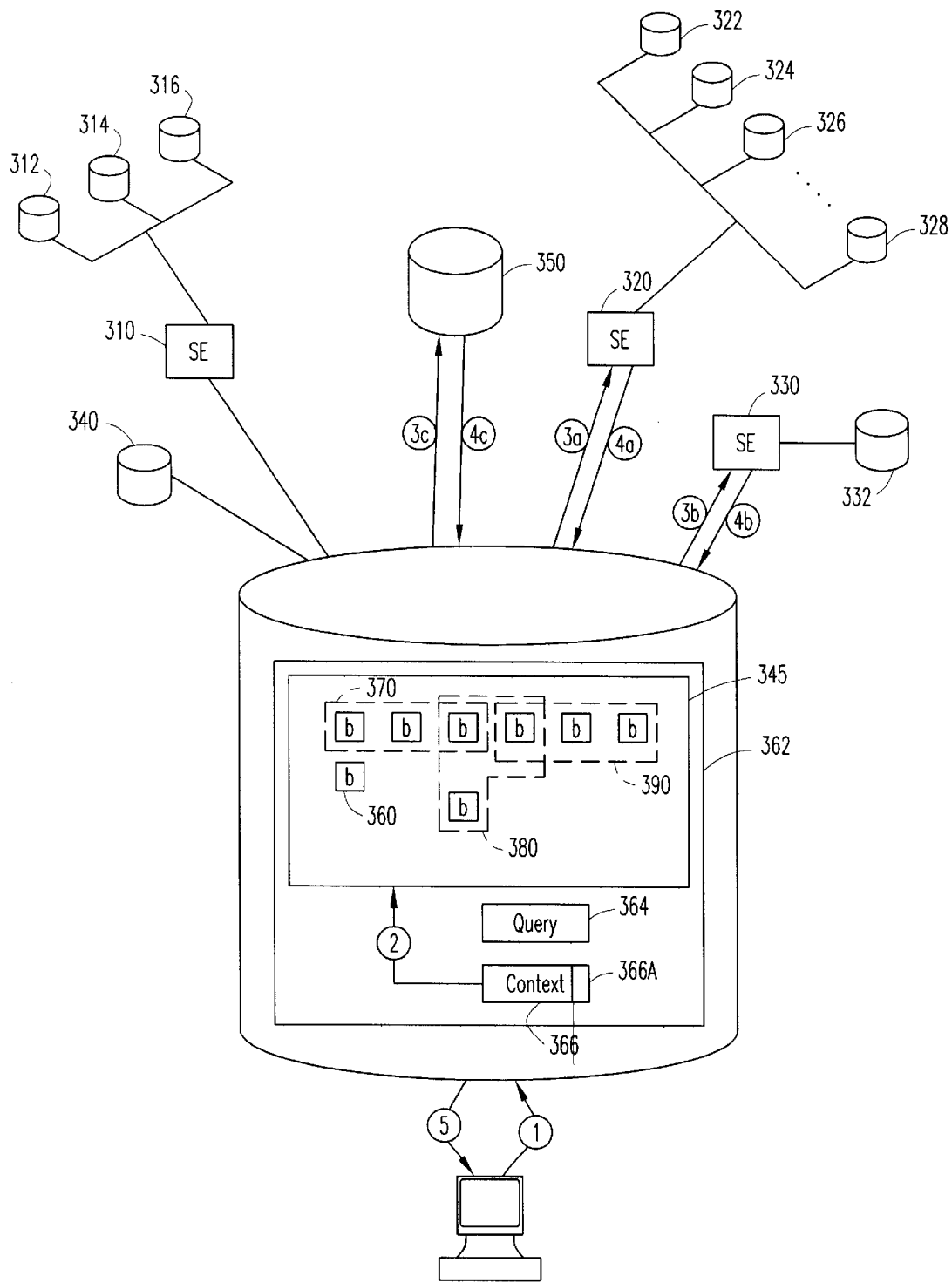
FIG. 3 illustrates the operation of the metasearch engine pursuant to the present invention within the network configuration of FIG. 1.

Shown in FIG. 3 is a more detailed event chronology of a metasearch engine 362 receiving and submitting a query with an associated context. Included in MSE 362 are a plurality of IRPs each grouped into sets, or contexts, the entire set of contexts contained within Context Store 345. Four contexts 360, 370, 380 and 390 have been defined for the aforementioned IRPs a–h of FIG. 2. Context 360, for example, is comprised of a single IRP g associated with IR 314. Context 370 is comprised of IrPs a, b and c which are respectively associated with IRs 322, 350 and 310. By including an IRP in association with an SE (IRP c), the IRs available for a query with a matching context are effectively expanded. In other words, where IRP b of context 370 gives access to a single IR 350, the inclusion of IRP c within Context 370 effectively enables access to all those IRs associated with SE 310. Context 380 is comprised of IRPs c, d and h each respectively associated with IRs 310, 320 and 330. Context 390 is comprised of IRPs d, e and f, each respectively associated with IRs 320, 350 and 330.

A user operating from Terminal 302 enters a query into a Query Field 364 and an associated context into Context Field 366 (step 1). Consistent with the illustrative contexts depicted, the user may choose one of the four available contexts by choosing the Context Example Field 166A button. For representative purposes, the Contexts 360, 370, 380 and 390 will be arbitrarily denoted as Context_A, Context_B, Context_C and Context_D, respectively. The input query is arbitrarily referred to as Query_1 and for illustrative purposes, the input context selected is Context_D.

MSE 362 first recovers the input context from the query/context input. The input context is then compared to all contexts in a Context Store 345 of the aforedescribed and other IRPs to evaluate whether or not a match exists (step 2). Upon determination of a match between the input context and at least one stored context, the IRPs of the stored matching context are interrogated for appropriate context, location, action and pattern information as aforedescribed with reference to FIG. 2. For the current example, these IRPs are d, e and f IRPs d and f are associated with IRs 320 and 330, respectively, both of which are IRs providing SEs. Therefore, MSE 362 would parse and reformat Query_1 into formats appropriate for interaction with IRs 320 and 330. These reformatted queries for forwarding to IRS 320 and 330 are herein referred to as Query_1_32 and Query 1_33, respectively. Query_1_32 and Query_1_33 are then forwarded to IRs 320 and 330 (steps 3a, 3b). Furthermore IRP c provides logical directives to MSE 302 for mining the non-indexed IR 350 in a manner consistent with FIG. 2 and the accompanying description. MSE 362 accordingly initiates communication and data mining with IR 350 (step 3c). Results from the queries on IR 320 and 330 are returned to MSE 362 upon completion of the searches by the respective SEs (steps 4a, 4b). Likewise, the mined data from IR 350 is returned to MSE 362 upon completion of the mining action. The results may then be subjected to a fusion algorithm and the final query result is reported to the user at Terminal 302 (step 5).

Figure 4:
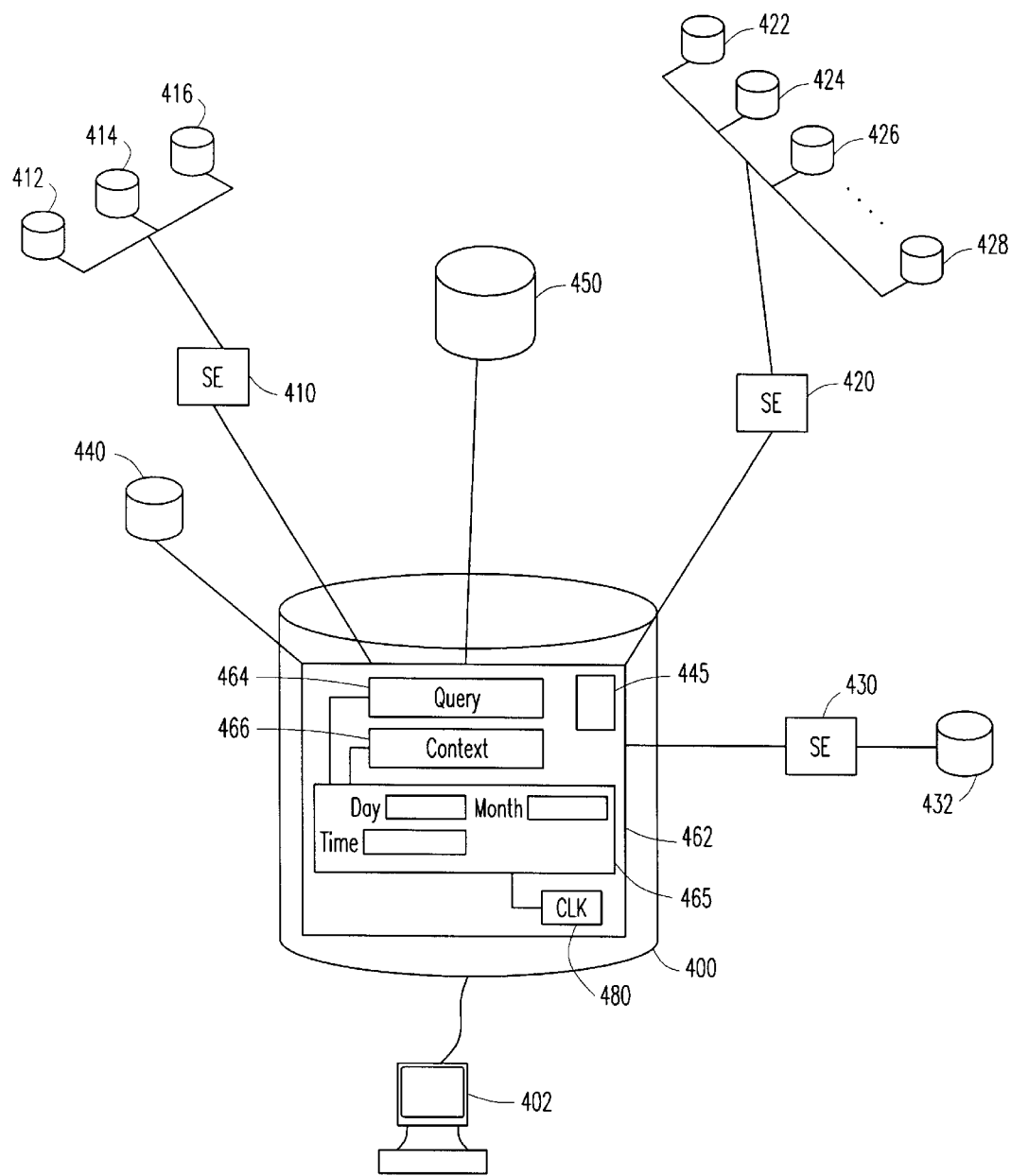
FIG. 4 illustrates another embodiment of the system and method of the present invention.

A second embodiment of the present invention may be realized with only a slight modification to the MSE 362 depicted and described with reference to FIG. 3. With reference now to FIG. 4, there is shown a metasearch engine 462 which, in addition to the functionality of MSE 362, includes batch processing capabilities. MSE 462 is located within a server 400 and receives queries and associated contexts supplied by a user operating from a terminal 402 and input through the respective query field 464 and the context example field 466. MSE 462 also contains a context store 445 for sharing at least one set of contexts (not shown) for context comparison as above described.

In addition to inputting a query and context, a user has the option to specify batch processing of a query through input of the batch data in batch store 465. Day, month and time fields are included within the batch store 465 for input of query time data. Batch store 465 reads input queries and contexts from the respective query field 464 and context example field 466 and stores these data with the associated batch processing input. System clock 480 is coupled to batch store 465 thereby enabling batch store 465 to compare stored batch query data with clock times. When a match exists between a stored batch query time and the system clock 480 time, the query is retrieved and processed according to those methods described with reference to FIG. 3. Results from the query may also be stored with batch store 465 with additional batch data specifying a time the result is returned to the user at terminal 402.

Figure 5:
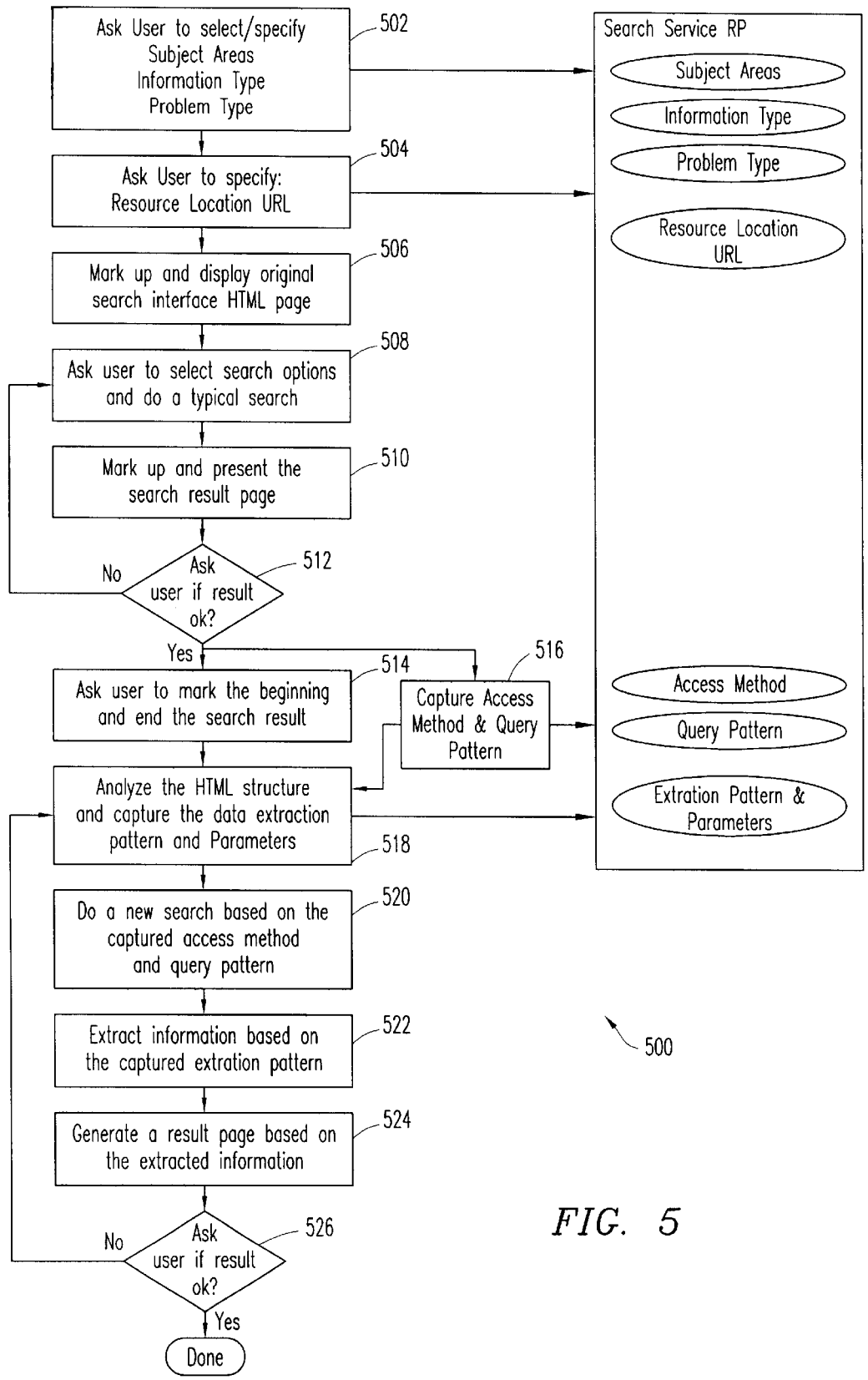
FIG. 5 is a flowchart representing steps in the creation of an information resource profile in accordance with the present invention.

With reference now to FIG. 5, there is illustrated a flowchart 400 for the creation of a search service IRP in accordance with the present invention. As discussed above, a user must select/specify (box 502) a context, e.g., from subject areas, information type and problem type, as illustrated at the right of FIG. 4. The user is then asked to specify (box 504) a URL or other resource location where the desired information is thought to reside. A search interface page, e.g., in HTML, is then presented for markup and display (box 506), and the user requested to select search options for a typical search (box 508). The search result page is then presented for markup to the user (box 510) and the user asked if the page is correct (box 512).

If so, i.e., the page is entered correctly, the user is then asked to mark the beginning and end of the search result (box 514) and to request the desired capture access method and query pattern (box 516). After the above, the HTML structure is analyzed and the data extraction pattern and parameters entered (box 518). A new search is then performed based upon the captured access method and query pattern entered (box 520), and the information extracted based upon the captured extraction pattern (box 522). A result page is then generated (box 524) based upon the extracted information, and the user again requested if the results are satisfactory. If so, the procedure is complete and the new IRP is created; otherwise, control transfers back to box 518, continuing from that step, as discussed hereinabove.

Figure 6:
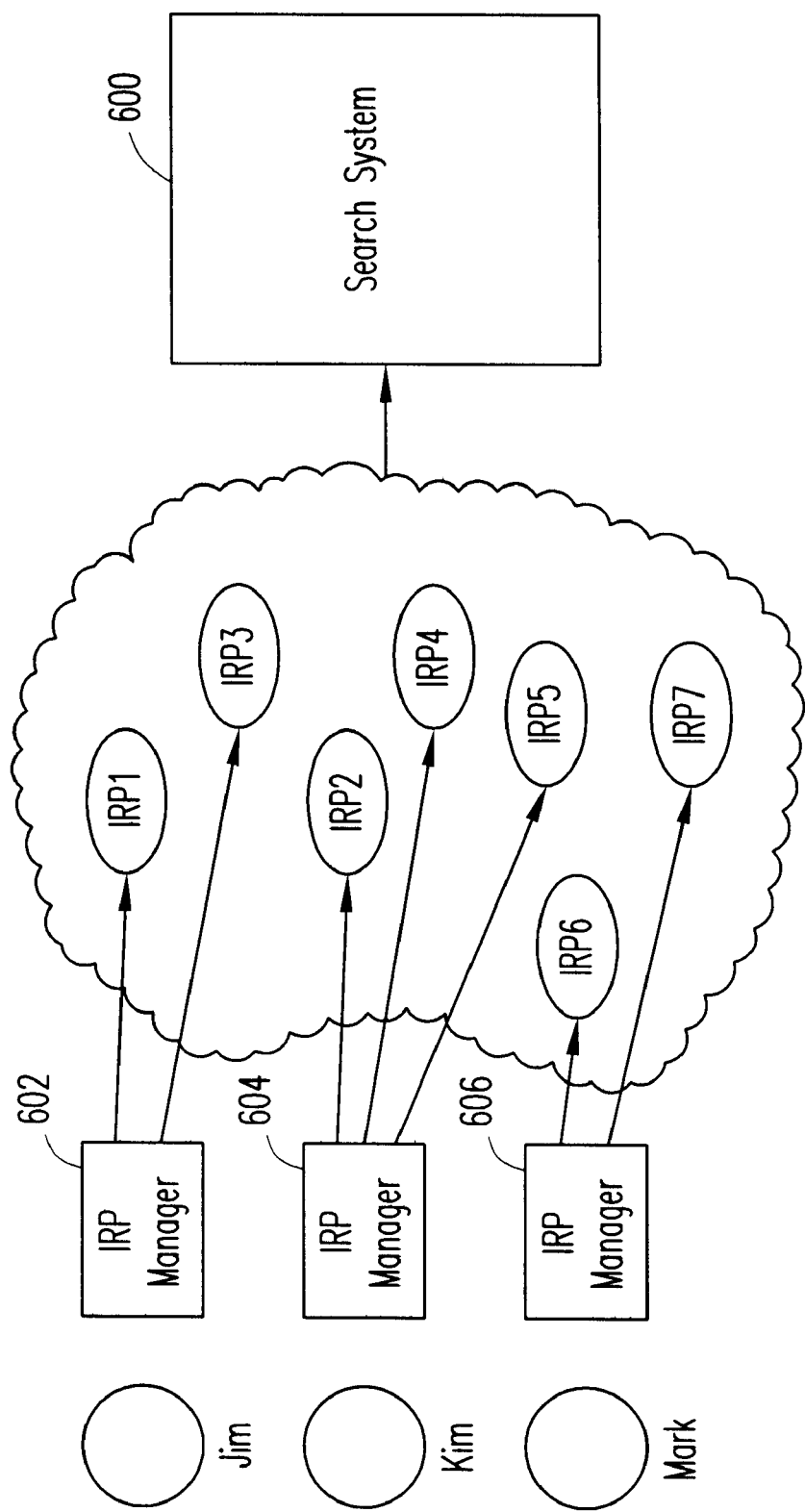
FIG. 6 illustrates a management tool for managing the information resource profiles created in FIG. 5 for the system of FIG. 1.

With reference now to FIG. 6, there is shown a methodology whereby the various IRPs of a given search system, such as system 600 in FIG. 5, can be managed by a group of domain experts in a distributed manner. In a preferred embodiment of the present invention this is implemented using a number of IRP managers, such as managers 602, 604 and 606. By use of these IRP managers, a domain expert, such as one skilled in the plastics industry and knowledgeable about the various relevant web-based resources, can create, test, delete and view the IRPs and any relationships therebetween or groups thereof In particular, various domain experts, labeled Jim, Kim and Mark utilize the respective IRP management tools 602, 604 and 606. Manager 602 correlates with two IRPs, i.e., IRP1 and IRP3. Similarly, manager 604 correlates with IRP2, IRP4 and IRP5, and manager 506 correlates with IRP6 and IRP7. As discussed in connection with FIG. 2, these profiles, in turn, correlate with particular IRs utilized by the metasearch tool also within system 600.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for facilitating the searching of heterogeneous information resources within a distributed computer system using a search query and a search context, said method comprising the steps of:

receiving, at a metasearch engine on a host computer within said distributed computer system, said search query and said search context associated therewith;

comparing, by said metasearch engine, said search context to a plurality of stored search contexts; and requesting, by said metasearch engine, a number of search results from a corresponding number of heterogeneous information resources using said search query and said search context, said search results from the heterogeneous information resources having a stored search context substantially matching said search context.

2. The method according to claim 1, wherein said plurality of stored search contexts are stored within a context store containing a corresponding plurality of information resource profiles for respective information resources, whereby said respective information resource profiles facilitate the searching of said heterogeneous information resources within said distributed computer system by narrowing the searching to only those information resources having an information resource profile substantially matching said search context.

3. The method according to claim 2, wherein at least one of said respective information resource profiles comprises at least one context field therein selected from the group consisting of subject area, information type and problem type, whereby said searching is narrowed to information resources substantially matching at least one of said context fields.

4. The method according to claim 2, wherein at least one of said respective information resource profiles comprises a location field therein selected from the group consisting of pointer, address, access method and security, whereby said searching is narrowed to information resources substantially matching at least one of said location fields.

5. The method according to claim 2, wherein at least one of said respective information resource profiles comprises an action field therein selected from the group consisting of information access and navigation, whereby said searching is narrowed to information resources substantially matching at least one of said action fields.

6. The method according to claim 2, wherein at least one of said respective information resource profiles comprises a pattern field therein selected from the group consisting of information extraction and return parameters, whereby said searching is narrowed to information resources substantially matching at least one of said pattern fields.

7. The method according to claim 1, wherein said step of requesting is performed in batch mode, said search query and associated search context being stored within a batch store for a given time period corresponding to a search time received by said metasearch engine in said step of receiving, said search time being associated with said search query and said search context.

8. The method according to claim 1, further comprising the step of:
retrieving, from at least one of said number of information resources, corresponding search results.

9. The method according to claim 8, further comprising the step of:
ordering said retrieved search results pursuant to the context thereof.

10. The method according to claim 1, wherein said metasearch engine in said step of requesting requests said search results from said number of information resources simultaneously.

11. The method according to claim 1, further comprising the step of:
fusing said number of search results received from said corresponding number of information resources.

12. The method according to claim 1, wherein, if a given information resource is non-indexed, said method further comprises the step of:
browsing said given information resource using said search query.

13. The method according to claim 1, wherein, if a given information resource is non-indexed, said method further comprises the step of:
data mining said given information resource using said search query.

14. The method according to claim 1, wherein, if a given information resource is non-indexed, said method further comprises the step of:
downloading, from said given information resource, a plurality of pages associated therewith;
indexing said plurality of downloaded pages; and
searching said indexed, downloaded pages using said search query.

15. The method according to claim 1, wherein said information resources are selected from the group consisting of a web site, database, search engine, computer file, indexed file and non-indexed file.

16. A method for facilitating searching via a metasearch engine among indexed and non-indexed information resources within a distributed computer system using a search query and a search context, said method comprising the steps of:
determining for a respective one of said indexed and non-indexed information resources a respective information resource profile associated therewith, said respective information resource profile having a search context field therein;
inputting a search context value into the search context field of said respective information resource profile, said search context value being associated with the content of said respective one information resource, whereby said respective one information resource is searchable using a search context query;
receiving said search query and said search context associated therewith;
comparing said search context to a plurality of stored search contexts; and
requesting a number of search results from a corresponding number of indexed and non-indexed information resources using said search query and said search context, said search results from information resources having a stored search context substantially matching said search context.

17. The method according to claim 16, further comprising repeating said determining and inputting steps for a plurality of said information resources in said distributed computer system.

18. The method according to claim 16, wherein said step of inputting further comprises the step of:
inputting into said respective information resource profile a search context value selected from the group consisting of subject area, information type and problem type.

19. The method according to claim 18, wherein said step of inputting further comprises the step of:
inputting into said respective information resource profile a location field selected from the group consisting of pointer, address, access method and security.

20. The method according to claim 16, wherein said step of inputting further comprises the step of:
inputting into said respective information resource profile an action field selected from the group consisting of information access and navigation.

21. The method according to claim 16, wherein said step of inputting further comprises the step of:
inputting into said respective information resource profile a pattern field selected from the group consisting of information extraction and return parameters.

22. The method according to claim 16, wherein said information resources are selected from the group consisting of a web site, database, search engine, computer file, indexed fire and non-indexed file.

23. A computer system for facilitating the searching of heterogeneous information resources using a search query and a search context, said computer system comprising:
a metasearch engine for receiving said search query and said search context associated therewith;
requesting means, within said metasearch engine, for requesting a number of search results from a corresponding number of heterogeneous information resources using said search query and said search context; and
comparison means for comparing said search context to a plurality of context fields in a plurality of information resource profiles, whereby said plurality of information resource profiles facilitate the searching of said heterogeneous information resources within said computer system by narrowing the searching to only those heterogeneous information resources having an information resource profile substantially matching said search context.

24. The computer system according to claim 23, further comprising:

a context store containing said plurality of information resource profiles for said corresponding plurality of information resources, each said information resource profile containing said context field therein.

25. The computer system according to claim 23, wherein said comparison means compares a context field selected from the group consisting subject area, information type and problem type, whereby said searching is narrowed to information resources substantially matching at least one of said context fields.

26. The computer system according to claim 23, wherein said comparison means further compares a location field selected from the group consisting of pointer, address, access method and security, whereby said searching is narrowed to information resources substantially matching at least one of said location fields.

27. The computer system according to claim 23, wherein said comparison means further comprises an action field selected from the group consisting of information access and navigation, whereby said searching is narrowed to information resources substantially matching at least one of said action fields.

28. The computer system according to claim 23, wherein said comparison means further comprises a pattern field selected from the group consisting of information extraction and return parameters, whereby said searching is narrowed to information resources substantially matching at least one of said pattern fields.

29. The computer system according to claim 23, further comprising batch means for storing said search query and said search context for a given time period.

30. The computer system according to claim 23, further comprising:

retrieval means for retrieving said number of search results from said information resources.

31. The computer system according to claim 30, further comprising:

ordering means for ordering said retrieved search results.

32. The computer system according to claim 23, further comprising:

browsing means for browsing a given non-indexed information resource using said search query.

33. The computer system according to claim 23, further comprising:

data mining means for data mining a given non-indexed information resource using said search query.

34. The computer system according to claim 23, further comprising:

downloading means for downloading, from a given non-indexed information resource, a plurality of pages associated therewith;

indexing means for indexing said downloaded pages; and searching means for searching said indexed, downloaded pages using said search query.

* * * * *

UNITED STATES PATENT AND TRADEMARK OFFICE
CERTIFICATE OF CORRECTION

PATENT NO.    : 6,490,579 B1
DATED         : December 3, 2002
INVENTOR(S)   : Gao et al.

It is certified that error appears in the above-identified patent and that said Letters Patent is hereby corrected as shown below:

<u>Column 1,</u>
Line 31, remove ":"

<u>Column 2,</u>
Line 30, delete "Hpeitext" and replace with -- Hypertext --

<u>Column 3,</u>
Line 57, delete "a vailable" and replace with -- available --

<u>Column 8,</u>
Line 36, delete "IrPs" and replace with -- IRPs --

<u>Column 10,</u>
Lines 34-35, delete "heterogeneous" and replace with -- indexed and non-indexed --
Lines 44 and 54, delete "heterogeneous" and replace with -- indexed and non-indexed --
Line 46, delete "heterogeneous"

<u>Column 11,</u>
Lines 38 and 43, delete "wherein, if a given"
Lines 39 and 44, delete "information resource is non-indexed, said method"
Line 40, delete "comprises" and replace with -- comprising --
Lines 41 and 46, delete "given" and replace with -- non-indexed --
Line 45, delete "comprises" and replace with -- comprising --

<u>Column 12,</u>
Line 47, delete "fire" and replace with -- file --
Lines 50 and 56, delete "heterogeneous" and replace with -- indexed and non-indexed --
Lines 62-63, delete "heterogeneous" and replace with -- indexed and non-indexed --
Lines 64-65, delete "heterogeneous"

UNITED STATES PATENT AND TRADEMARK OFFICE
CERTIFICATE OF CORRECTION

PATENT NO.    : 6,490,579 B1
DATED         : December 3, 2002
INVENTOR(S)   : Gao et al.

It is certified that error appears in the above-identified patent and that said Letters Patent is hereby corrected as shown below:

<u>Column 14,</u>
Line 14, delete "a given" and replace with -- said --
Line 18, delete "a given" and replace with -- said --

Signed and Sealed this

Seventeenth Day of June, 2003

JAMES E. ROGAN
*Director of the United States Patent and Trademark Office*